Patented June 3, 1941

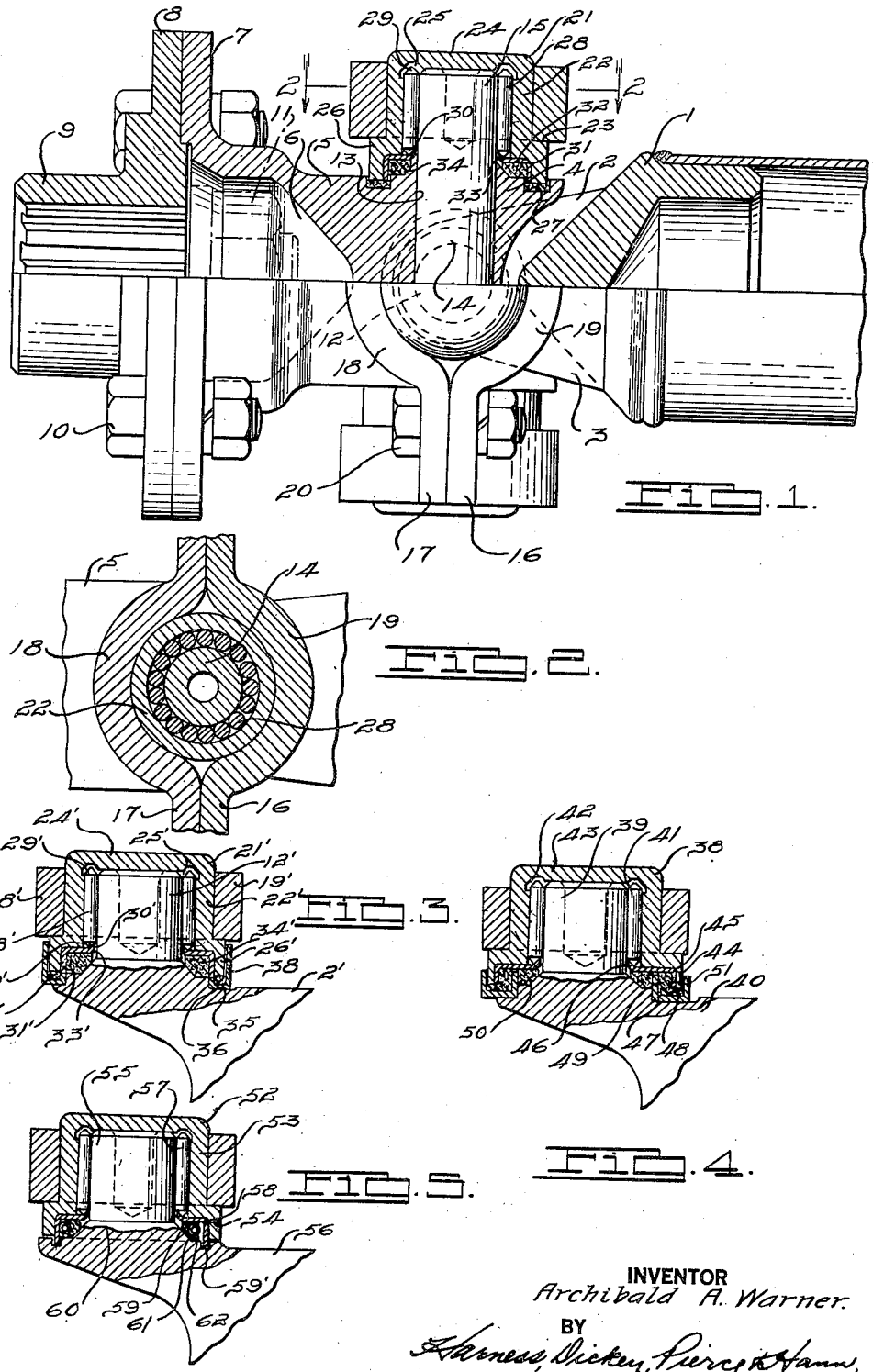

2,244,380

UNITED STATES PATENT OFFICE 2,244,380

UNIVERSAL JOINT

Archibald A. Warner, Royal Oak, Mich., assignor to Universal Products Co., Inc.

Application March 23, 1931, Serial No. 524,446

7 Claims. (Cl. 64—17)

This invention relates to improved means for sealing the bearings of a universal joint of the type shown in my co-pending application, Serial Number 524,445, filed Mar. 23, 1931.

The main objects of the invention are to provide improved means to obstruct the passage of dirt into the bearings of a universal joint of the type disclosed in said copending application; to provide a baffle at the open extremity of each bearing around which dirt must pass in opposition to the outwardly directed forces of the centrifugal action which is created during rotation of the universal joint in order to gain entrance to the interior of the bearings; to provide channel-ways in the structure of the universal joint that is adjacent the open end of the bearings for receiving such baffles; and to provide packing in the channel-ways for obstructing the passage of dirt to the interior of the bearings and for preventing leakage of lubricant therefrom.

An illustrative embodiment of the invention is shown in the accompanying drawing in which:

Fig. 1 is a side elevation showing a universal joint which embodies my invention, partly in section, Fig. 2 is a transverse horizontal section taken on the line 2—2 of Fig. 1.

Fig. 3 is a fragmentary vertical section of a universal joint showing a trunnion which is equipped with a bearing that embodies a modified form of the invention.

Fig. 4 is a fragmentary section of a universal joint, showing a trunnion which is provided with a bearing that embodies another form of the invention.

Fig. 5 is a view, similar to Figs. 3 and 4, illustrating a further development of the invention.

In the form shown in Figs. 1 and 2 of the drawing, the invention is illustrated in conjunction with a universal joint which includes a rotatable yoke-shaped driven member 1 having protruding arms 2 and 3 between which is receivable an end portion 4 of a rotatable driving member 5. The outer end portion of the driving member 5 is cylindrical in shape and it is provided with a central recess 6 and an outwardly extending radial flange 7 by which it may be conveniently secured to a flange 8 of a splined collar 9, by bolts 10. The splined collar 9 is adapted to receive an end portion of a drive shaft (not shown) to which it may be rigidly attached by a nut 11 that may be confined in the recess 6 of the tubular end portion of the driving member.

Integrally formed on the arms 2 and 3 of the yoke of the driven member 1 are trunnions 12 which have enlarged base portions. The solid end portion 4 of the driving member 5 is provided with a transverse passage 13 through which a pin 14 extends. The pin 14 fits tightly in the passage 13 and it protrudes at its respectively opposite ends beyond the side edges of the solid end portion so as to provide spaced trunnions 15 at the respectively opposite sides of the driving member 5. The trunnions 12 and 15 of the driving and driven members are located substantially 90 degrees apart and their central axis lie substantially in a single plane.

These trunnions are connected together by a torque ring which includes complementary sections 16 and 17, each having four registering, semi-cylindrical depressions, or sockets 18 and 19 respectively. The sections 16 and 17 of the torque ring are rigidly fixed together by bolts 20 which extend through registering apertures in those portions of the ring sections that are located between the depressions 18 and 19. The complementary registering depression 18 and 19 form four complete bands which are each located substantially 90 degrees apart and in which the trunnions 12 and 15 are received.

Mounted on the trunnions of the universal joint are rolling contact bearings which are substantially identical in construction. Each bearing includes a cup-shaped casing 21 having a cylindrical side portion 22 located between the inner periphery of the band formed by the complementary depression 18 and 19 of the torque ring sections, and the inner periphery of the trunnion. The bands which surround the bearings are seated upon an outwardly extending radial shoulder 23 of the cylindrical portion of the bearing casing 21.

Formed in the end wall 24 of the casing 21 is an annular groove 25 which extends outwardly beyond the inner periphery of the casing providing an undercut recess which renders grinding of the inner periphery of the casing simple and convenient. The open end of the casing 21 has an outwardly offset wall 26 which admits a portion of the enlarge base part of the trunnion into the interior of the casing.

The extremities of the outwardly offset section 26 of the bearing casings on the trunnions of the driven and driving members 1 and 2 respectively, register with substantially planular surfaces on the driving and driven members, in which are formed circular channel-ways or grooves 27, that are concentric with the trunnions. The outwardly offset or skirt portions 26 of each bearing casing extends into the channel-ways 27 forming baffles around which it is necessary for dirt and dust ladened air to pass, in opposition to the centrifugal forces created during rotation of the universal joint, in order to enter the open end of the bearing.

A plurality of rollers 28 are arranged in a circular series between the adjacent periphery of the trunnion and the bearing casing. These rollers have tapered, conical, reduced end portions 29 and 30, the inner end portions 30 being received in an annular groove 25 of the end wall 24 of the casing. A sheet metal sleeve 31 having an inward, radially extending section 32 is pressed into the enlarged open end portion of the casing. Formed on the inner edge of the radially extending section 32 of the sleeve is an inclined flange 33 which is located between the adjacent peripheries of the trunnion and casing. The inclination of the flange 33 is substantially parallel to the inclination of the tapered end portion 30 of the rollers 28. This inclined flange, in conjunction with the walls of the groove 25 of the closed end 24 of the casing, holds the roller 28 against displacement prior to assembly of the bearing on the trunnion. The cylindrical portion of the sleeve 31 also extends into the annular channel-way 27 and it terminates in the plane of the open extremity of the casing 21.

Located in the space between the inner-periphery of the offset section 26 of the bearing casing 21 and the base portion of the trunnion is a packing ring 34 which preferably comprises felt or other suitable yieldable material. The packing ring 34 extends into the channel-way 27 between the extremity of the offset section 26 of the casing and the bottom of the channel-way. This packing material engages the inner-periphery and extremity of the offset section 26, forming a dirt seal around the open end of the bearing which prevents dirt from entering the latter and prevents leakage of the lubricant which is imbedded between the rollers 28. The packing also yieldably holds the rolling contact bearings against inward movement with respect to the axis of the universal joint within the limits permitted by the thrust bearing clearances between the ends of the trunnion and the end walls 24 of the cups.

In Fig. 3 of the drawing is illustrated a bearing which includes a casing 21', that is substantially identical in construction to the casing 21 shown in Fig. 1, and which is journaled on a trunnion 12' of a yoke arm 2' of the driven member of a universal joint. The casing 21' has a cylindrical portion 22' which is located within a band formed by complementary depressed portions 18' and 19' of a torque ring. The outer end of the casing 21' is closed by an end wall 24' and the inner open end of the casing is bounded by an outwardly offset wall 26'. A plurality of rollers 28' having reduced, tapered ends 29' and 30' are located between the adjacent peripheries of the casing 21' and trunnion 12'. These rollers are held against displacement prior to assembly of the bearing on the trunnion by the walls of an annular groove 25' in the end wall 24' of the casing and by an inwardly extending flange 33' of a sheet metal sleeve 31' which is pressed in the enlarged open end of the casing. Located between the base of the trunnions and the sleeve 31' is a packing ring 34' which aids in sealing the open end of the bearing against the division of dirt and the leakage of lubricant.

Mounted on the arm 2' of the yoke of the driving member of the universal joint is an annular sheet metal trough 35 which is concentrically located with respect to the trunnion 12' and which has a channel-way 36. The outwardly offset end portion 26' of the casing 21' registers with the channel-way 36 of the trough 35 and the extremity of the offset end portion rests upon a packing ring 37. The outer wall 38 of the trough 35 overlaps substantially the full length of the offset section 26' of the casing and is located in close proximity to the outer periphery of the offset section.

The only passage through which dirt, or dust ladened air may enter the interior of the bearing extends between the outer periphery of the offset section 26' of the casing and the inner periphery of the outer wall 38 of the trough 35. In order for dirt to enter through this passage during rotation of the universal joint, it is necessary for the dirt to travel inwardly toward the axis of the joint against the centrifugal action which effectively opposes such inward movement of the dirt.

The universal joint trunnion bearing illustrated in Fig. 4, includes a cup-shaped casing 38 which is substantially identical to the casing 21 and 21' shown in Fig. 1 and Fig. 3 respectively. This casing is journaled on a trunnion 39 of a yoke arm 40 of one element of the universal joint. Between the trunnion and the inner periphery of the casing 38 are located a plurality of rollers 41 having opposite tapered extremities. The tapered extremities of the inner ends of the rollers are received in an annular groove 42 which is formed in the closed end wall 43 of the casing. Provided at the open end of the casing 38 is an outwardly offset wall or skirt section 44 in which is received a sheet metal sleeve 45 having an inwardly extending flange 46 located between the periphery of the trunnion 39 and the inner periphery of the casing for holding the rollers 41 against displacements from the casing prior to assembly of the bearing on the trunnion.

A ring shaped trough 47 having a circular channel-way 48 is mounted on the side of the yoke arm 40 in concentric relationship with respect to the trunnion 39. The offset skirt 44 of the bearing casing 38 and the sleeve 45 extend into the channel 48 around the outer extremities thereof. The inner portions of the channel 48 are filled by a packing ring 49 which contacts with the internal periphery of the sleeve 44 and forms a shield for preventing the admission of dirt into the interior of the bearings and for preventing the leaking of the lubricant which is imbedded between the rollers 41. The packing ring 49 extends between the bottom wall of the trough 47 and the extremities of the sleeve and skirt 45 and 44 respectively. A packing ring 50 which is also formed of yieldable material such as felt is located between the inwardly extending flange of the sleeve 44 and the base portion of the trunnion. The packing ring 50 together with the packing ring 49 yieldably holds the bearing against inward movement toward the axes of the universal joint within the limits permitted by the thrust bearing clearances between the ends of the trunnion and the end walls 24 of the cups and seals the open end of the casing against the admission of dirt and the escapement of lubricant.

The outer side wall 51 of the trough 49 extends outwardly around the external periphery of the offset skirt 44 and forms a path through which dirt is required to flow in opposition to the centrifugal forces created during rotation of the universal joint, in order to enter the bearing.

In the form of the invention shown in Fig. 5, the bearing includes a casing 52 having a cylindrical side portion 53 and an outwardly offset wall or skirt 54 around its open extremity. This bearing is journaled on a trunnion 55 of an arm 56 of a universal joint and it is provided with rollers 57. The rollers 57 are held against displacement from the casing 52 by a sleeve 58 having an inwardly extending flange 59 which terminates between the peripheries of the trunnion 55 and the inner periphery of the casing 52. The outer end portion of the sleeve 58 protrudes beyond the open extremity of the casing 52 and is received in a circular groove 59' which is concentric with the trunnion 55. Located between the base portions 60 of the trunnion 55 and the inwardly extending flange 59 of the sleeve 58 is a folded washer, 61 preferably comprising leather, between the diverging sides of which is located a coil spring 62. The washer 61 and spring 62 form an effective seal at the open end of the bearing for preventing the admission of dirt into the bearing and the escapement of lubricant from the bearing. The protruding end portion of the sleeve 58 which extends into the circular groove 59' forms a baffle around which dirt is required to flow in opposition to the centrifugal forces created during rotation of the universal joint in order to gain entrance to the interior of the bearings.

As in the joint of applicant's aforementioned copending application in all forms of joint herein disclosed centering of the joint is secured by contact of the ends of the trunnions against the bottoms of the bearing cups. Thus, those points of contact are at the place of greatest lubrication.

Although but several specific embodiments of this invention have been herein shown and described, it will be understood that numerous details of the construction shown may be altered or omitted without departing from the spirit of this invention as defined by the following claims.

I claim as my invention:

1. In a universal joint, the combination of a plurality of relatively movable members including a member having a pair of substantially aligned openings therein and a second member having a pair of trunnions extending outwardly into said openings, bearing cups disposed in said openings around said trunnions and closing said openings outwardly of the trunnions therein, a sleeve of independent cylindrical rollers between each of said cups and trunnions, a channel containing an annular packing surrounding the base of each trunnion, said channel opening toward the adjacent bearing cup, said cups having end portions projecting inwardly from the openings in which said cups are disposed substantially beyond said rollers and extending into the channels and engaging said packings, and retaining means providing abutments to retain the same in said openings and maintain the inwardly projecting end portions of the cups against the packings in said channels and with the rollers free to move longitudinally in the cups.

2. In a universal joint, the combination of a plurality of relatively movable members including a member having a pair of substantially aligned openings therein and a second member having a pair of trunnions extending outwardly into said openings, bearing cups disposed in said openings around said trunnions and closing said openings outwardly of the trunnions therein, a sleeve of independent cylindrical rollers between each of said cups and trunnions, a channel containing an annular packing surrounding the base of each trunnion, said channel opening toward the adjacent bearing cup, said cups having end portions projecting inwardly from the openings in which said cups are disposed substantially beyond said rollers and extending into the channels and engaging said packings, and means to retain the cups in said openings and maintain the inwardly projecting end portions of the cups against the packings in said channels.

3. In a universal joint, a trunnion projecting radially with respect to the axis of the joint, a closed ended integral bearing cup around the trunnion and having an end thrust bearing engagement with the trunnion for centering the joint, cylindrical rollers between the trunnions and the side wall of the cup, an annular shell fitted on said trunnion adjacent the base thereof and having a base portion and an axially extending periphery forming an annular channel opening toward the cup, and a packing ring in said channel, said bearing cup having its inner extremity extending within the channel and directly engaging the side of the packing ring opposite that engaged by the bottom of the channel.

4. In a universal joint, a trunnion projecting radially with respect to the axis of the joint, a bearing cup around the trunnion and having an end thrust bearing engagement with the trunnion for centering the joint, cylindrical rollers between the trunnion and the inner surface of the cup, annular shells mounted respectively on the trunnion and the open end of the cup and extending axially toward each other into overlapping relation with the overlapping portion of the trunnion mounted shell spaced radially outwardly of the adjacent portion of the cup mounted shell, said shells having axially spaced radially extending inner portions, and a packing ring between and engaging the latter portions.

5. In a universal joint, a trunnion projecting radially with respect to the axis of the joint, a bearing cup around the trunnion and having an end thrust bearing engagement with the trunnion for centering the joint, cylindrical rollers between the trunnion and the inner surface of the cup, a pair of annular rings fitted respectively on the trunnion and the open end of the cup and extending axially toward each other into overlapping relation with the overlapping portion of the trunnion mounted ring spaced radially outwardly of the adjacent portion of the cup mounted ring, and a packing ring positioned within said rings and sealing the open end of the cup.

6. In a universal joint, a trunnion projecting radially with respect to the axis of the joint, a bearing cup around the trunnion and having an end thrust bearing engagement with the trunnion for centering the joint, cylindrical rollers between the trunnion and the inner surface of the cup, means defining an outwardly opening channel adjacent the base of the trunnion, a packing in said channel, and a ring fitted on the open end of the cup and having a portion positioned within the channel and in contact with the packing therein.

7. In a universal joint having four radially extending trunnions, a bearing assembly for each trunnion including a bearing cup around the trunnion and having an end-thrust bearing with the trunnion for centering the joint, cylindrical rollers between the trunnion and the inner surface of the cup and extending parallel with the axis of the trunnion, means at the base of the trunnion defining an outwardly projecting annular wall co-axial with the trunnion, a packing ring within the annular space between said outwardly projecting wall and the trunnion, and means on the cup engaging said packing in said annular space.

ARCHIBALD A. WARNER.

CERTIFICATE OF CORRECTION.

Patent No. 2,244,380. June 3, 1941.

ARCHIBALD A. WARNER.

It is hereby certified that error appears in the printed specification of the above numbered patent requiring correction as follows: Page 3, second column, lines 9, 24, 39, and 54, claims 3, 4, 5, and 6 respectively, after the word "cup" and before the comma, insert --and extending parallel to the axis of the trunnion--; and that the said Letters Patent should be read with this correction therein that the same may conform to the record of the case in the Patent Office.

Signed and sealed this 29th day of July, A. D. 1941.

(Seal)

Henry Van Arsdale,
Acting Commissioner of Patents.